United States Patent [19]

Maschek et al.

[11] 4,144,285

[45] Mar. 13, 1979

[54] PROCESS FOR PRODUCING HYDROLYSIS-STABLE SHAPED STRUCTURES OF POLYESTER

[75] Inventors: Max Maschek, Domat-Ems, GR, CH; Marcel Capaul; Wolfgang Griehl, both of Chur, GR, CH, all of Switzerland

[73] Assignee: Inventa AG Fur Forschung und Patent-verwertung, Zurich, Zurich, Switzerland

[21] Appl. No.: 804,140

[22] Filed: Jun. 6, 1977

[51] Int. Cl.$^2$ .............................................. C08L 67/06
[52] U.S. Cl. ................................. 260/873; 260/8.60; 528/273; 528/309
[58] Field of Search ...................... 260/873, 75 T, 860; 528/273, 309

[56] References Cited

U.S. PATENT DOCUMENTS

| | | | |
|---|---|---|---|
| 3,657,191 | 4/1972 | Titzmann et al. | 260/75 T |
| 3,752,866 | 8/1973 | Doerr | 260/860 |
| 3,869,427 | 3/1975 | Meschke et al. | 260/47 EP |
| 3,975,329 | 8/1976 | Barnewall et al. | 260/75 T |
| 4,016,142 | 4/1977 | Alexander et al. | 260/75 T |
| 4,017,463 | 4/1977 | Okuzumi | 260/75 T |

*Primary Examiner*—Richard B. Turer
*Attorney, Agent, or Firm*—Bierman & Bierman

[57] ABSTRACT

A process is disclosed for treating polyester material with at least one N-glycidylimide compound which results in reducing the terminal carboxyl group content of the polyester material.

13 Claims, No Drawings

PROCESS FOR PRODUCING HYDROLYSIS-STABLE SHAPED STRUCTURES OF POLYESTER

The present invention relates to a process for producing hydrolysis-stable shaped structures of polyester material and to the structures so obtained.

Polyesters can be prepared in a known manner by heating dicarboxylic acids or their ester-forming derivatives with diols to temperatures of up to 300° C. Terephthalic acid is an example of the dicarboxylic acid employed. This acid can be, if necessary, admixed with other aromatic and/or aliphatic dicarboxylic acids.

The diols used include aliphatic diols of the general formula $$HO-(CH_2)_n-OH$$

wherein n represents a whole number from 2-10 and also substituted aliphatic diols such as, for example, 2,2-dimethylpropane-1,3-diol, and/or cycloaliphatic diols such as 1,4-bishydroxymethylcyclohexane may also be used. Furthermore, other ester-forming compounds such as hydroxycarboxylic acids or polymethylene oxides may also be employed for preparing polyesters.

The resulting products of the aforementioned reaction are linear polyesters or copolyesters of high molecular weight to which various additions such as, for example, delustering agents, may be added. The molecular chains of these polyesters are characterized as having primarily —COOH and —OH groups in the terminal positions.

In order to process these polyesters, which are generally in the form of granules, they are usually melted in an extruder and conveyed by means of a screw into a spinning or injection molding device where they are worked up through a spinneret plate and formed into filaments, tire cord or threads. Alternatively, the melted granules are conveyed to an injection mold or some other shaping tool and formed into a variety of shaped structures.

In the foregoing process, the polyester suffers partial thermal and hydrolytic degradation. The degree of degradation depends primarily on the temperature and the dwell time in the extruder. These degradation reactions produce, on the one hand, a reduction in the molecular weight and thereby in the viscosity of the polyester and, on the other hand, an increase in the concentration of carboxyl terminal groups in the macromolecule.

If shaped structures of polyester or the articles produced therefrom are subjected to a high degree of stress during their use, especially to high temperatures or lengthy exposure to moisture, alcohols, acids or amines, additional degradation reactions, such as hydrolysis, alcoholysis or aminolysis, take place and further lower the molecular weight of the polyester resulting in a reduction of the strength of the polyester. The extent of these degradation reactions, in particular hydrolysis, is dependent, above all, on the concentration of the carboxyl terminal groups. The higher the content of the terminal carboxyl groups, the greater the degradation.

Processes for preparing polyesters with a reduced carboxyl terminal group content are already known. In these processes, for example, suitable compounds are employed which are able to react with the terminal carboxyl groups of the polyester. The previously known processes have certain disadvantages. When glycide ethers are added, after-treatment of the granules at elevated temperatures is necessary (Swiss Pat. No. 534,710). Diepoxides, when used for fibers, filaments and threads, interfere with the working-up of the material because the polyester becomes cross-linked (British Pat. No. 1,139,379). Carbodiimides (U.S. Pat. Nos. 3,193,522 and 3,193,523) are unsuitable because they cause discoloration of the polyester. Ketenes and diketenes (Belgian Pat. No. 553,273) are poorly suited because of the formation of undesirable anhydride groups. Additionally, handling these compounds is difficult because they are highly reactive with, for example, atmospheric moisture.

It has now been found that when N-glycidylimides are employed, these disadvantages are eliminated. These compounds can be handled without any problems and can be applied to the polyester melt in simple manner. For example, they can be employed by powdering the polyester granules or by adding metered amounts in melted form to the polyester melt. Moreover, they lead to better results than do, for example, glycidyl ethers.

Accordingly, the present invention relates to a process for producing hydrolysis-stable shaped structures consisting of polyesters by working the polyester material in the presence of compounds which reduce the carboxyl terminal group content of these polyesters. This process is characterized in that N-glycidylimides are employed as compounds reducing the carboxyl terminal group content.

The preferred polyesters are selected from polyethylene terephthalate, polybutylene terephthalate or polyethylene naphthalate; polyethylene terephthalate and polybutylene terephthalate being the most preferred. The polyester material may be in the form of granules or in melted form.

The term "working" is intended to include in particular a melt spinning process. Additionally, the term "shaped structures" encompasses, for example, threads, fibers, filaments, tire cord, injection-molded parts and the like.

The N-glycidylimides utilized in the present invention are reaction products of carboxylic acid imides (or their alkali metal salts, such as the potassium salt) with epihalohydrin, in particular epichlorohydrin.

Advantageously, the imides are selected from cyclic imides, in particular, five-membered imides. More specifically, preferred imides of dicarboxylic acids are these whose carboxyl groups are separated by two or three carbon atoms, preferably, two carbon atoms. For example there can be employed imides of succinic or maleic acid, but most especially imides of cyclic dicarboxylic acids, such as cyclohexane-1,2-dicarboxylic acid, cyclohexenedicarboxylic acids having two adjacent carboxyl groups, phthalic acid, naphthalene-1,2- and -2,3-dicarboxylic acid.

Naturally, mixtures of N-glycidylimides may also be employed. Advantageously, the N-glycidyl compound of phthalic acid imide is used wherein the nucleus of phthalic acid may be substituted with alkyl(preferably having 1 to 4 carbon atoms), halogen, such as chlorine, or aryl such as phenyl.

During the working-up process, the N-glycidylimides enter into reactions with the free carboxyl terminal groups wherein the number of these groups are reduced. If granules of polyester are used, a special advantage of the process according to the invention results in that no preliminary or after-treatment of the polyester material at elevated temperatures and under other drastic conditions (elevated pressure, etc.) is necessary. However, moisture should be excluded from the reaction. Of course, the application of the material to the granules may also be carried out at rather high temperatures if this seems necessary for purely practical reasons. Thus, for example, if the granules are dried at an elevated temperature, it is not necessary to wait until the granules have cooled to contact them with the N-glycidylimides. In this event the reaction can be carried out at about 180° C.

By adding N-glycidylimides according to the invention to the polyester material, the hydrolysis resistance of the shaped structures produced by extrusion, can be considerably improved in comparison with non-treated polyesters. Moreover, the process according to the invention is more easily employed than previously known processes.

The N-glycidylimide content of the polyester depends on the molecular weight of the N-glycidylimide as well as the content of free carboxyl terminal groups in the polyester. The amount of N-glycidylimide added is advantageously in the range of 0.05 to 6% by weight and in particular between 0.2 and 1.5% by weight based on the total weight of the said material.

It is also possible, however, to added metered amounts of N-glycidylimides in a melted state continuously to the melted polyester. In this case, the melted N-glycidylimide or mixtures of melted N-glycidylimides are passed into the polyester melt by means of an apparatus conventionally employed for this kind of reaction. For example, the N-glycidylimide melt is allowed to flow into the stream of polyester and the entire flow is then passed into a mixing device. Suitable mixing devices are, for example, extruders, advantageously containing a mixing zone, or static mixers.

The following Examples are presented for illustrative purposes only and are not meant to limit the invention as defined in the broadest claim of the present application. The analysis values given were determined as follows:

The relative viscosity ($\eta_{rel}$) was measured at 20° C. from a 0.5% by weight solution of the polyester in a mixture of phenol and 1,1,2,2-tetrachloroethane (1:1% by weight). In order to determine the concentration of free carboxyl groups, (abbreviated hereinafter as [COOH]), a measured amount of polyester was dissolved in a mixture of phenol and chloroform and titrated with benzyl alcohol caustic potash solution against tetrabromophenol blue as an indicator.

The lowering of the viscosity of the polyester after a 6-hour treatment with water at 130° C. (measured in the Lini-Test apparatus of Quarzlampen GmbH, Hanau, Federal Republic of Germany) was used as a measure of stability against hydrolytic degradation. The lowering of viscosity was calculated in % "broken bonds" (% broken bonds = %BB) in accordance with the equation $$\%BB = 50 \left( \frac{1}{\overline{Pn}_n} - \frac{1}{\overline{Pn}_v} \right),$$

$\overline{Pn}_v$ and $\overline{Pn}_n$ stand for the average degree of polymerization before and after the hydrolytic degradation, respectively.

EXAMPLE 1

Dried microdelustered polyethylene terephthalate granules, i.e. with 0.04% of $TiO_2$ added, with $\eta_{rel} = 1.391$ and [COOH] = 24 m val/kg, were powdered with 1.0% by weight of N-glycidylphthalimide (N-GP) in a drum under a dry inert gas atmosphere. These granules were melted by means of an extruder and conveyed into a spinning installation, from which the melt was spun through a one-hole spinneret into a thread (monofilament) at a delivery rate of 30 g/min. The values for [COOH] and hydrolytic degradation (% BB) of the resulting thread are shown in Table 1.

EXAMPLE 2 (comparison Example)

The polyethylene terephthalate granules described in Example 1 were spun under the same conditions as in Example 1, but without any addition of (N-GP). The values for [COOH] and hydrolytic degradation (% BB) in the resulting threads are shown in Table 1.

Example 1 according to the present invention shows a marked improvement in stability against hydrolysis and a marked reduction in the [COOH] compared with the companion material of Example 2.

Table 1

| Example | Addition | [COOH] (mval/kg) | Hydrolytic degradation (% BB) |
|---------|----------|------------------|-------------------------------|
| 1 | 1.0% by weight of N-GP | 10 | 0.028 |
| 2 | — | 34 | 0.102 |

EXAMPLE 3

Dried non-delustered polyethylene terephthalate granules with $\eta_{rel} = 1.390$ and [COOH] = 23 m val/kg were powdered with 0.73% by weight of N-GP in the same way as in Example 1 and worked up into a thread. The values for [COOH] and hydrolytic degradation (% BB) are shown in Table 2.

EXAMPLE 4 (Comparison Example)

The polyethylene terephthalate granules described in Example 3 were spun under the same conditions as in Example 3, but without any addition. The resulting threads showed values for [COOH] and hydrolytic degradation (% BB) set foth in Table 2. A considerable improvement in stability against hydrolysis and a decrease in the [COOH] of Example 3 compared with the material without any addition in Example 4 was achieved.

Table 2

| Example | Addition | [COOH] (mval/kg) | Hydrolytic degradation (% BB) |
|---------|----------|------------------|-------------------------------|
| 3 | 0.73% by weight of N-GP | 13 | 0.051 |
| 4 | — | 34 | 0.102 |

EXAMPLE 5

Dried non-delustered polybutylene terepthalate granules with $\eta_{rel} = 1.395$ and [COOH] = 38 mval/kg were powdered with 1.5% by weight of N-GP in the same was as in Example 1. These granules were melted by means of an extruder and conveyed into a spinning installation, from which the melt was spun into filaments through a 30-hole spinneret at a delivery rate of 80 g/min. The values for [COOH] and hydrolytic degradation (% BB) in the filaments are shown in Table 3.

EXAMPLE 6 (Comparison Example)

The polybutylene terephthalate granules described in Example 5 were spun under the same conditions as in Example 5, but without the addition of N-GP. The values for [COOH] and hydrolytic degradation found in these filaments are likewise shown in Table 3.

Table 3

| Example | Addition | [COOH] (mval/kg) | Hydrolytic degradation (% BB) |
|---|---|---|---|
| 5 | 1.5% by weight of N-GP | 21 | 0.061 |
| 6 | — | 47 | 0.110 |

EXAMPLE 7

The polyethylene terephthalate described in Example 1 was powdered with 1.1% by weight of N-gylcidyl-1,2-cyclohexanedicarboxylic acid imide (N-GCI) under the same conditions as in Example 1. These granules were melted by means of an extruder and conveyed into a spinning installation, from which the melt was spun through a one-hole spinneret into a thread (monofilament at a delivery rate of 50 g/min. The values for [COOH] and hydrolytic degradation (% BB) in the resulting monofilament are shown in Table 4.

EXAMPLE 8 (Comparison Example)

The polyethylene terephthalate granules used in Example 7 were spun under the same conditions as in Example 7, but without any addition. The values for [COOH] and hydrolytic degradation (% BB) found in the resulting monofilament are likewise shown in Table 4.

Table 4

| Example | Addition | [COOH] (mval/kg) | Hydrolytic degradation (% BB) |
|---|---|---|---|
| 7 | by weight of N-GCI | 9 | 0.026 |
| 8 | — | 34 | 0.102 |

EXAMPLE 9

Dried microdelustered polyethylene terephthalate granules, i.e. with 0.04% of TiO$_2$ added, with $\eta_{rel}$ = 1.391 and [COOH] = 24 mval/kg, were powdered with 1.25% by weight of N-glycidylphthalimide (N-GP) in a drum under a dry inert gas atmosphere. These granules were melted by means of an extruder and conveyed into a spinning installation, from which the melt was spun through a one-hole spinneret into a thread (monofilament) at a delivery rate of 30 g/min. The values for [COOH] and hydrolytic degradation (% BB) in the resulting thread are shown in Table 5.

EXAMPLE 10 (Comparison Example)

The polyethylene terephthalate granules described in Example 9 were spun under the same conditions as in Example 9, but without any addition. The values for [COOH] and hydrolytic degradation (% BB) found in the resulting threads are likewise shown in Table 5.

Example 9 according to the invention shows a marked improvement in stability against hydrolysis and a marked reduction in the [COOH] compared with the material of Example 10 without any addition.

Table 5

| Example | Addition | [COOH] (mval/kg) | Hydrolytic degradation (% BB) |
|---|---|---|---|
| 9 | 1.25% by weight of N-GP | 3 | 0.006 |
| 10 | — | 34 | 0.102 |

EXAMPLE 11

Dried polyethylene terephthalate granules delustered with 0.4% by weight of TiO$_2$, with $\eta_{rel}$ = 1.412 and [COOH] = 21 mval/kg, were melted in an extruder provided with a mixing zone. Prior to entering the mixing zone, N-glycidylphthalimide, (N-GP) which was previously melted in a melting vessel, was continuously metered into the stream of melt in an amount of 0.95% by weight, based on the weight of the polyester granules, by means of a suitable metering pump. The polyester melt, intimately mixed with the (N-GP) in the mixing zone, was thereafter conveyed into a spinning installation and spun therefrom through a one-hole spinneret into a monofilament at a rate of 30 g/min. The values for [COOH] and hydrolytic degradation (% BB) in the resulting monofilament are shown in Table 6.

EXAMPLE 12

The polyethylene terephthalate described in Example 11 was spun under the same conditions as in Example 11, but without any addition. The values for [COOH] and hydrolytic degradation in the resulting monofilament are likewise shown in Table 6.

Table 6

| Example | Addition | [COOH] (mval/kg) | Hydrolytic degradation (% BB) |
|---|---|---|---|
| 11 | 0.95% by weight of N-GP | 7 | 0.015 |
| 12 | — | 28 | 0.082 |

EXAMPLE 13

Oligomeric polyethylene terephthalate which was prepared by continuous esterification of terephthalic acid with ethylene glycol was fed continuously into a polycondensation system. By increasing the temperature to 285° C. and lowering the pressure to 0.3–0.5 Torr, a polyethylene terephthalate with $\eta_{rel}$ = 1.55 and [COOH] = 25 mval/kg was prepared. The polymer melt was extracted from the final reaction vessel by means of a discharge extruder. In the compression zone of the discharge extruder, melted N-glycidylphthalimide (N-GP) was metered continuously into the polyester melt by means of a suitable metering pump in an amount of 1.3% by weight, based on the amount of polyethylene terephthalate. The polymer melt, furnished with the (N-GP), was conveyed into a spinning installation, from which it was spun into filaments through a 200-hole spinneret at a rate of 240 g/min. The values for [COOH] and hydrolytic degradation (% BB) determined in the resulting filaments are shown in Table 7.

EXAMPLE 14

Polyethylene terephthalate was prepared as in Example 13 and spun into filaments under the same condition as in Example 13, but without any addition. The values for [COOH] and hydrolytic degradation (% BB) determined in the resulting filaments are likewise shown in Table 7.

Table 7

| Example | Addition | [COOH] (mval/kg) | Hydrolytic degradation (% BB) |
|---------|----------|------------------|-------------------------------|
| 13 | 1.3% by weight of N-GP | 5 | 0.014 |
| 145 | — | 30 | 0.0113 |

What we claim is:

1. In a process for the production of hydrolysis-stable shaped structures consisting essentially of a polyester material produced by the reaction of dicarboxylic acids with substituted or unsubstituted aliphatic diols having the formula

$$HO-(CH_2)_n-OH$$

wherein n is an integer of from 2 to 10 or polyesters prepared from hydroxycarboxylic acids, or polymethylene oxides or their ester forming derivatives, the improvement comprising treating said polyester material with at least one N-glycidylimide compound in an amount equal to 0.05–6.0% by weight based on the total weight of said material, whereby the terminal carboxyl group content is reduced.

2. The process of claim 1 wherein said material is in the form of granules.

3. The process of claim 1 wherein said material is in the form of a melt.

4. The process of claim 1 wherein said polyester material is selected from the group consisting of polyethylene terephthalate, polybutylene terephthalate and polyethylene naphthalate.

5. The process of claim 1 wherein said N-glycidylimide compounds are N-glycidylimides of dicarboxylic acids whose carboxyl groups are separated by two or three carbon atoms.

6. The process of claim 1 wherein said amount is equal to 0.2–1.5% by weight.

7. The process of claim 1 wherein said N-glycidylimide compounds are selected from the group consisting of N-glycidylimides of succinic acid, N-glycidylimides of maleic acid, and N-glycidylimides of cyclic dicarboxylic acids.

8. The process of claim 1 wherein said N-glycidylimide compounds are N-glycidylimides of dicarboxylic acids selected from cyclohexane -1,2-dicarboxylic acid, phthalic acid, cyclohexane dicarboxylic acids having adjacent carboxyl groups, naphthalene -1,2-dicarboxylic acid and naphthalene 2,3-dicarboxylic acid.

9. The process of claim 8 wherein said dicarboxylic acid is phthalic acid which may have substituents selected from alkyl, halogen and aryl.

10. The process of claim 3 further comprising continuously treating said polyester melt with said compound in a melted form.

11. In a process for the production of hydrolysis-stable shaped structures consisting essentially of a material selected from polyethylene terephthalate, polybutylene terephthalate, and polyethylene naphthalate, the improvement comprising continuously treating said polyester material in the form of a melt with at least one N-glycidylimide compound in the form of a melt in an amount equal to 0.05 to 6.0% by weight based on the total weight of said material, whereby the terminal carboxyl group content of said material is reduced.

12. The process of claim 11 wherein said amount is 0.2–1.5% by weight on the total weight of said material.

13. A product produced by the product of claim 1.

* * * * *